June 2, 1970  JEAN-MICHEL BALUTEAU ET AL  3,515,460
OPTICAL BEAM SEPARATOR FOR COLOUR TELEVISION
Filed July 14, 1967
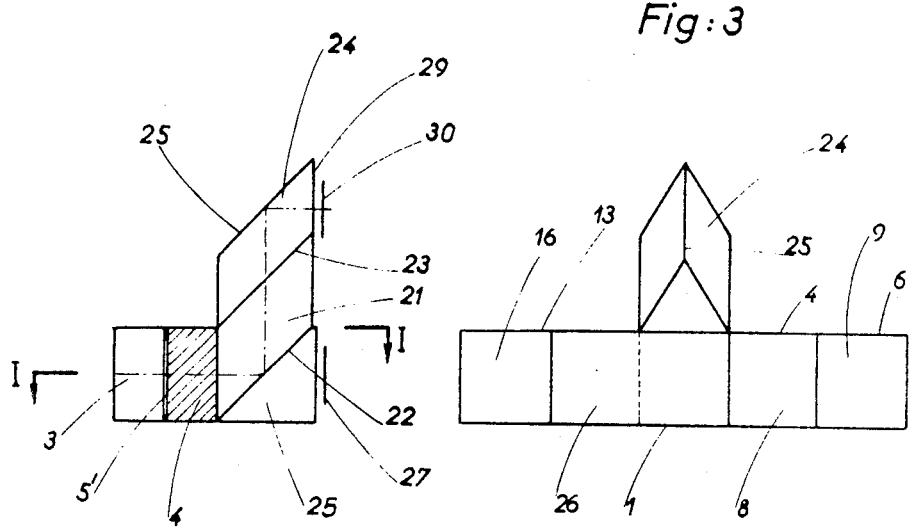
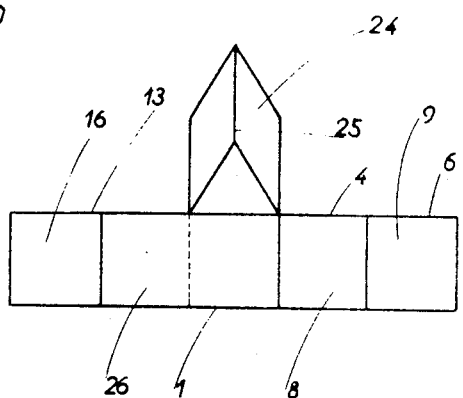
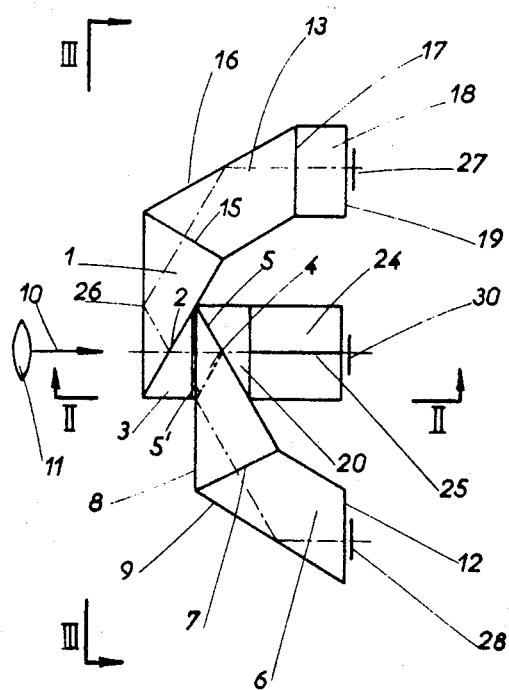

United States Patent Office 3,515,460
Patented June 2, 1970

3,515,460
OPTICAL BEAM SEPARATOR FOR COLOUR TELEVISION
Jean-Michel Baluteau, Livry-Gargan, and Christian Rodier, Creteil, France, assignors to Societe d'Optique Precision, Electronique, et Mecanique, Paris, France, a corporation of France
Filed July 14, 1967, Ser. No. 653,572
Claims priority, application France, Aug. 5, 1966, 72,274
Int. Cl. G02b 27/14; G03b 33/62
U.S. Cl. 350—173                    1 Claim

ABSTRACT OF THE DISCLOSURE

An optical beam separator particularly for three-colour television, characterised in that it has an entry prism from which the beam will be divided into three component beams by means of three paths defined by prisms, prismatic elements, a roof prism and semi-reflective surfaces, the three images which will be obtained being in a single plane and having the same orientation, and the three beams traversing the same thickness of glass.

---

The invention relates to an optical beam separator for colour television.

Some colour television processes involve separating the beams into a plurality of component beams. For example, in the three-colour process, the beam from the taking lens is divided into three component beams, the first for the blue, the second for the green and the third for the red. Each of these component beams is sent to a transmitter tube, each image being in a different colour.

Known separator systems have various disadvantages. Some impose on the beam an excessively long light path so that a telephoto lens must be used, i.e. a lens giving a long distance between the last lens element and the image formed. Others form images which are not in parallel planes, and these images are affected by terrestrial magnetism which distorts them in various ways. Others form images which do not have the same orientation, so that the tubes require different scanning directions.

The object of the invention is to overcome these disadvantages.

According to the invention, the beam separator has an entry prism with a face perpendicular to the optical axis of the taking lens and an angle of 30°, at least part of the 30° face of this entry prism being partly reflective, a first 30° intermediate prism connected to the entry prism and with the opposite orientation to form an optical plate, a second 30° intermediate prism separated from the face of the first intermediate prism by a fluid gap and having on at least part of its face not perpendicular to the optical axis a partially reflective portion, these three first prisms having parallel edges, and a first prismatic element connected to the base of the second intermediate prism for reflecting a first beam of light parallel to the optical axis; the separator also contains a second prismatic element connected to the base of the entry prism for reflecting a second beam of light parallel to the optical axis; and the separator also has a third 30° intermediate prism connected to the partially reflective portion of the second intermediate prism and having a parallel edge, and a third prismatic element having, firstly, a reflective face at 45° to the optical axis and forming an angle of 45° with the edge of the entry prism and, secondly a face parallel to the reflective face, a roof prism with an angle of 45° being connected by its base to this last parallel face with the direction of its edge being concurrent with the optical axis, this roof prism, in use, reflecting a third beam of light parallel to the optical axis.

The invention will now be described in more detail with reference to a particular embodiment shown in the accompanying drawings, in which:

FIG. 1 is a plan view of a separator embodying the invention;
FIG. 2 is an offset section on a line II—II in FIG. 1; and
FIG. 3 is a view on a line III—III in FIG. 1.

The optical separator shown in the drawing has an entry prism 1 whose vertex angle is 30°. The face 2 of this prism has a partially reflective surface.

A first intermediate prism 3 with vertex angle of 30° is connected to the entry prism 1 on the face with the partially reflective surface. The edges of the prisms 1 and 3 are parallel, and the two prisms are arranged opposite each other in such a way that in combination they form an optical plate.

A second intermediate prism 4 is placed beside the first intermediate prism 3, leaving an air gap 5'. The angle at the vertex of the prism 4 is 30°. Its edge is parallel to the edges of prism 1 and 3, and its face 5 has a partially reflective surface.

A first prismatic element 6 is connected to the base 7 of the second intermediate prism 4. This base 7 forms an angle of 60° with the face 8 of prism 4. The prismatic element 6 has a face 9 forming an angle of 30° with the optical axis 10 of the taking lens 11. The exit face 12 of the prismatic element 6 is perpendicular to the optical axis.

A second prismatic element 13 is connected to the base of the entry prism. This prismatic element 13 is similar to element 6 and has an entry face 15 forming an angle of 60° with its face 16 and an exit face 17 perpendicular to the optical axis of the lens. An optical plate 18 is connected to face 17 to equalise the optical paths of beams forming images 27, 28.

A third intermediate prism 20 with a 30° vertex angle is connected to the face 5 of the second intermediate prism, and a prismatic element 21 with a face 22 at 45° to the optical axis 10 of the lens 11 forms an angle of 45° with the edge of the entry prism 1. This prismatic element 21 has a face 23 parallel to the reflective face 22 and adjacent to a roof prism 24 with a 45° angle, the edge 25 of this roof prism having a direction concurrent with the optical axis 10.

Separation of the beam from the lens 11 into three component beams takes place as follows.

A ray reaching the partially reflective surface 2 reflects some of the light, which is then completely reflected on face 26 of the entry prism 1 and face 16 of the prismatic element 13. This component beam then traverses face 17 and the optical plate 18 without being deflected, and forms the image 27 perpendicular to the optical axis.

The portion of the beam not reflected by the partially reflective surface 2 traverse this surface and the first intermediate prism 3. Some of this light is reflected by the partially reflective surface 5 on to the face 8 of prism 4, which reflects all of it. All of it is reflected again by face 9 of the prismatic element 6 and traverses the end face 12 perpendicularly, forming the image 28 in the same plane as the image 27.

Lastly, that portion of the light traversing the partially reflective surface 5 enters the prismatic element 21, is entirely reflected by the 45° face 22 and is then reflected on the roof prism 24, coming out at right-angles to the face 29 of this roof prism to form an image 30 in the same plane as images 27, 28.

The face 2 of prism 1 and the face 5 of prism 4 are each covered with a dichroic layer reflecting only single-colour images. For example the layer on face 2 may reflect only blue and that one face 5 only green, in which case the red passes into the roof prism 24. Three images 27, 28 and 30 of different colours are therefore obtained in the same plane.

It should be noted that the three component beams traverse the same thicknesses of glass.

The use of 30° prisms and 60° prismatic elements results in short paths, and the use of the roof prism 24 means that the three images all have the same orientation.

The optical separator described therefore overcomes the disadvantages of known devices of the same type.

In the optical separator disclosed herein, all the prisms and prismatic elements have the same index of refraction.

What is claimed is:

1. An optical beam separator for colour television, more particularly three-colour television, comprising a taking lens, an entry prism with a face perpendicular to the optical axis of said taking lens and having a vertex angle of 30°, at least part of the 30° face of said entry prism being partly reflective, a first 30° intermediate prism connected to said entry prism and with the opposite orientation to form an optical plate, a second 30° intermediate prism separated from the face of said first intermediate prism by a fluid gap and having on at least part of its face not perpendicular to said optical axis a partially reflective portion, said entry prism and said first and second intermediate prisms having parallel edges, and a first prismatic element connected to the base of said second intermediate prism for reflecting a first beam of light parallel to said optical axis; a second prismatic element connected to the base of said entry prism for reflecting a second beam of light parallel to said optical axis, the faces of said first and second prismatic elements, on which said first and second beams of light will be reflected, forming an angle of 60° with each other and an angle of 30° with said optical axis; and a third 30° intermediate prism connected to said partially reflective portion of said second intermediate prism and with the opposite orientation to form an optical plate and having a parallel edge, and a third prismatic element having a reflective face at 45° to said optical axis and forming an angle of 45° with the edge of said entry prism and having a face parallel to said reflective face and a roof prism with an angle of 45° connected by its base to said last named parallel face with the direction of its edge being concurrent with said optical axis, said roof prism reflecting a third beam of light parallel to said optical axis; an optical plate having its axis parallel to said optical axis and extending said second prismatic element; the dimensions of said prism, elements and plate being such that the path length of said first, second and third beams are equal; and the orientation of said prisms, elements and plate being such that the beam exit surfaces of said first prismatic element, said last named optical plate and said roof prism are in the same plane.

References Cited

UNITED STATES PATENTS

| 1,320,625 | 11/1919 | Kunz | 350—173 |
| 1,460,706 | 7/1923 | Comstock | 350—173 |
| 2,379,153 | 6/1945 | Holste | 350—174 X |
| 3,202,039 | 8/1965 | Lang et al. | 350—173 |

DAVID SCHONBERG, Primary Examiner

J. W. LEONARD, Assistant Examiner

U.S. Cl. X.R.

95—12.2; 178—5.4